United States Patent
Jones et al.

(10) Patent No.: US 6,287,128 B1
(45) Date of Patent: Sep. 11, 2001

(54) INTERCONNECTION BRACKET USED IN AN OPTICAL TRANSCEIVER MODULE

(75) Inventors: Dennis B. Jones, Orange; Jeng-Yih Hwang, Irvine, both of CA (US)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 09/626,536

(22) Filed: Jul. 27, 2000

(51) Int. Cl.⁷ .............................. H01R 12/00; H05K 1/00

(52) U.S. Cl. .............................. 439/76.1; 385/88; 385/89

(58) Field of Search ............................. 439/76.1; 385/92, 385/94, 88, 89, 83, 65, 77, 78; 361/206, 706, 712, 714

(56) References Cited

U.S. PATENT DOCUMENTS 5,966,487 * 10/1999 Gilliland et al. ........................ 385/92

* cited by examiner

Primary Examiner—Brian Sircus
Assistant Examiner—Javaid Nasri
(74) Attorney, Agent, or Firm—Wei Te Chung

(57) ABSTRACT

An interconnection bracket detachably fixed in a base is provided. The interconnection bracket comprises a housing defining two cavities therein for receiving two diodes each of which has a circular groove defined in periphery thereof. Each cavity has a retention rib formed therein for engaging with the circular groove of the diode. Two pairs of spring hooks extend forward from the housing for respectively retaining an external plug inserted into the cavity. Two rear plates extend rearward from the housing for guiding the diodes to be inserted into the cavities.

1 Claim, 7 Drawing Sheets

INTERCONNECTION BRACKET USED IN AN OPTICAL TRANSCEIVER MODULE

CROSS REFERENCE

This application is copending with the U.S. patent application with an unknown serial number filed on the same date with the invention and titled "OPTICAL TRANSCEIVER MODULE" which has common inventors and the same assignee of this application.

BACKGROUND OF THE INVENTION

1. Field of the Invention

The present invention relates to an interconnection bracket detachably fixed in a base of an optical transceiver module, more particularly, to an interconnection bracket for retaining diodes therein and also engaging with a printed circuit board which provides required circuitry in the optical transceiver module.

2. The Prior Art

Diodes are basic components used in an optical transceiver. Normally, an optical transceiver includes a photo diode and a laser diode for respectively receiving and sending optically encoded data. Therefore, the positioning and installation of the photo diode and the laser diode is important. U.S. Pat. No. 5,546,281 discloses an optical transceiver module having a potting box with potting material inserted therein. A printed circuit board is encased by the potting material. The printed circuit board has a photo diode and a laser diode soldered thereon before it is installed in the potting box. The photo diode and the laser diode extend outside of the potting box through a recess. A recess cover is provided for forming a liquid tight seal between the recess cover, the potting box, and the photo and laser diodes. With this structure, the photo and laser diodes need to be soldered on the printed circuit board first and then they are together installed inside the potting box. However, additional jigs or the like are required for aiding the diodes to be soldered to the printed circuit board before they are installed in the transceiver module. It is requisite to provide an interconnection bracket which is part of the transceiver module for simultaneously fixing the diodes and the printed circuit board in position before the diodes are soldered to the printed circuit board.

SUMMARY OF THE INVENTION

The primary purpose of the present invention is to provide a configurable interconnection bracket for retaining diodes and a printed circuit board in position before a soldering task is performed between the diodes and the printed circuit board.

According to one aspect of the present invention there is provided an interconnection bracket detachably fixed in a base. The interconnection bracket comprises a housing defining two cavities therein for receiving two diodes each of which has a circular groove defined in periphery thereof. Each cavity has a retention rib formed therein for engaging with the circular groove of the diode. Two pairs of spring hooks extend forward from the housing for respectively retaining an external plug inserted into the cavity. Two rear plates extend rearward from the housing for guiding the diodes to be inserted into the cavities.

DETAILED DESCRIPTION OF THE PREFERRED EMBODIMENT

Figure 1:
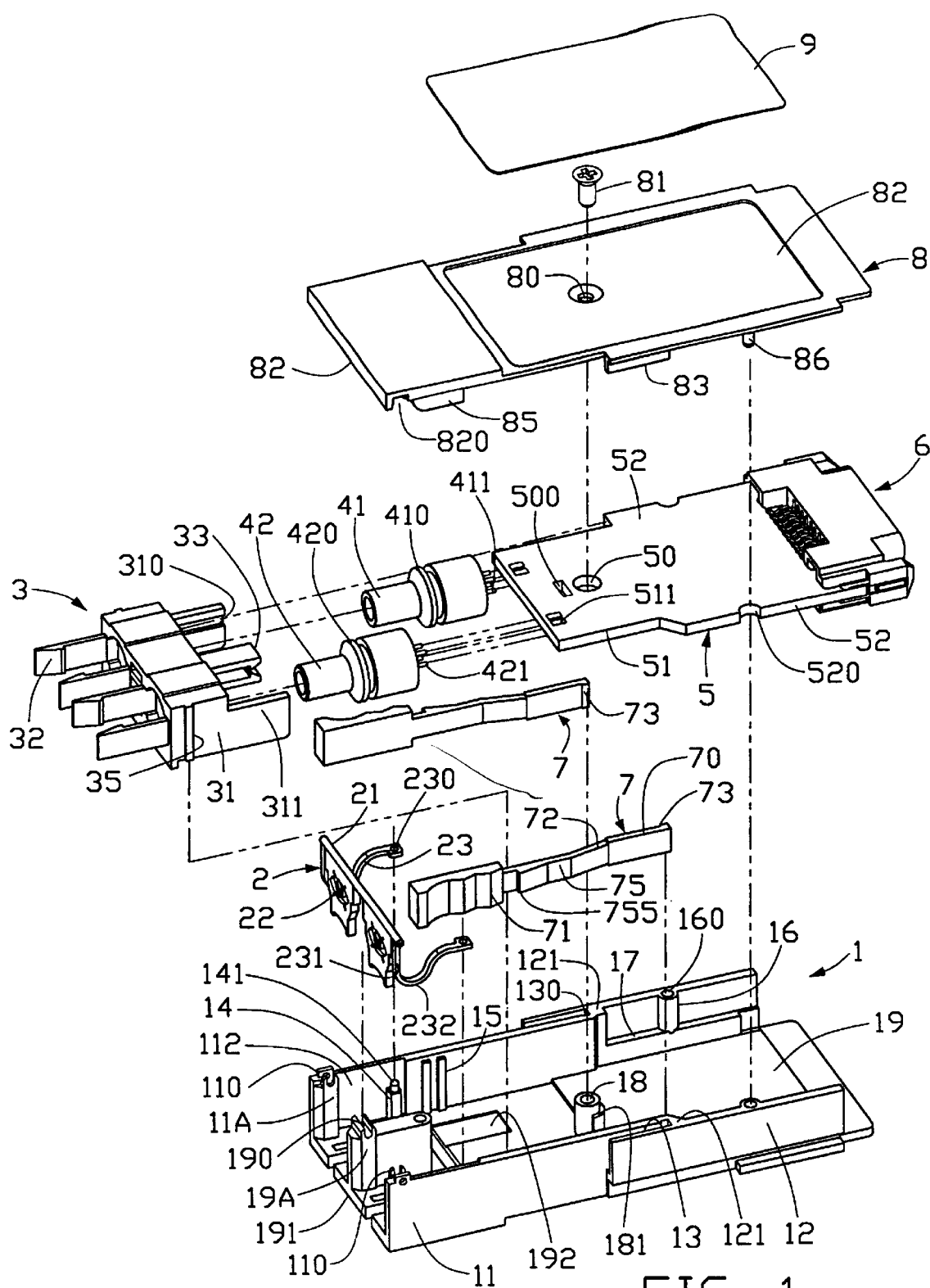
FIG. 1 is an exploded view of a transceiver module in accordance with the present invention.
Figure 2:
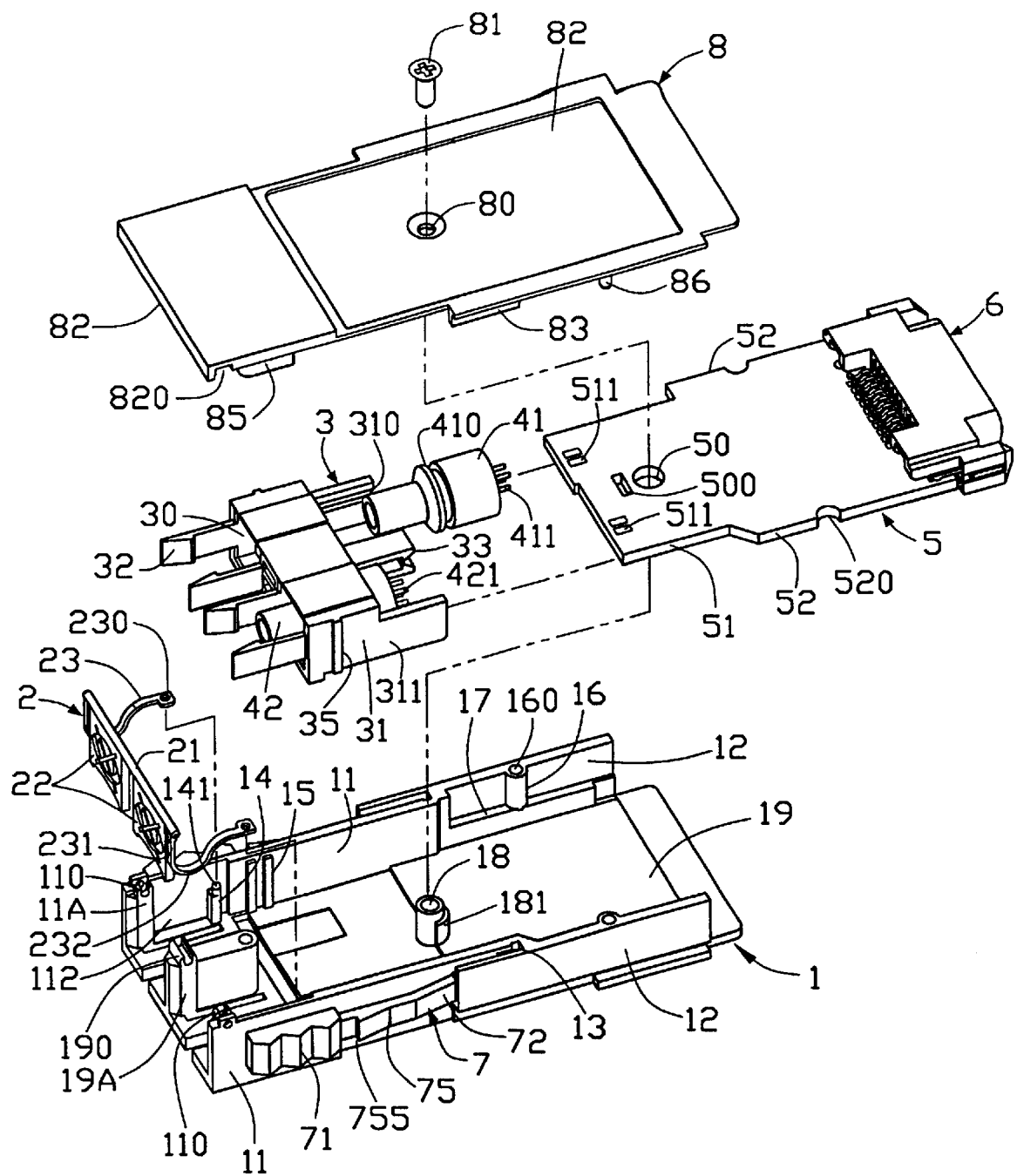
FIG. 2 is a similar view to FIG. 1 except that some of the parts have been assembled.

Referring to FIGS. 1 and 2, an optical transceiver in accordance with the present invention comprises a base 1, a shielding door 2 pivotally and resiliently fixed to the base 1, an interconnection bracket 3 detachably fixed to the base 1, a printed circuit board 5 fixed to the interconnection bracket 3 and firmly positioned in the base 1, a pair of resilient latches 7 fixed to two opposite sides of the base 1, and a cover 8 detachably mounted on the base 1.

The base 1 has a bottom plate 19, a pair of front side walls 11 and a pair of rear side walls 12 extending from two sides of the bottom plate 19, and each front side wall 11 and rear side wall 12 formed at the same side are connected to each other via an interconnection wall 121.

A reception socket 13 is formed by overlapped and spaced-apart sections of the front side wall 11 and the rear side wall 12, so that the reception socket 13 exposes to exterior from its top and front faces. A cutout 130 is defined in the reception socket 13. Specifically, the cutout 130 is formed at the outer periphery of the front side wall 11 around the interconnection wall 121.

Two stands 14 extend upward from the bottom plate 19 and are respectively integrated with inner surfaces of the front side walls 11. Each stand 14 has a positioning post 141 extends upward therefrom. A pair of positioning ribs 15 is formed on an inner surface of each front side wall 11, wherein the ribs 15 are parallel to each other. Therefore, there are opposite pairs of positioning ribs 15 formed on the front side walls 11, yet only one pair is shown in the drawing.

A boss 16 is formed on an inner surface of the rear side wall 12 and a vertical hole 160 is defined in the boss 16. A positioning step 17 is formed below the boss 16. A hollow post 18 extends upward from the bottom plate 19 and a peripheral seat 181 is formed at a periphery portion of the hollow post 18. A front central support 19A is formed on the bottom plate 19 near a front edge 191 thereof. Two front side supports 11A are formed on the bottom plate 19 and respectively integrated with inner surface of each front side wall 11. Pivot holes 190, 110 are respectively formed in the front central support 19A and the front side supports 11A, and the pivot holes 190, 110 are co-linear. A positioning space 112 is defined between each pair of the front side support 11A and the stand 14 which are integrated with the same front side wall 11. Two shallow recesses 192 (only one is shown) are formed in the bottom plate 19 substantially between the opposite pairs of the positioning ribs 15.

The shielding door 2 comprises a pivot 21 pivotably positioned in the in-line holes 110, 190 of the front side supports 11A and front central support 19A. Two shielding plates 22 extending from the pivot 21 are coplanar with each other. Two spring arms 23 extend from near two ends of the pivot 21. Each spring arm 23 has a vertical section 231 coplanar with the shielding plate 22 and a curved section 232 integrated with the vertical section 231 and extending away from the vertical section 231 horizontally for an offset distance. A hole 230 is defined at a terminated end of the curved section 232. The spring arm 23 is fixed to the stand 14 by engaging the hole 230 thereof with the positioning post 141.

Figure 4A:
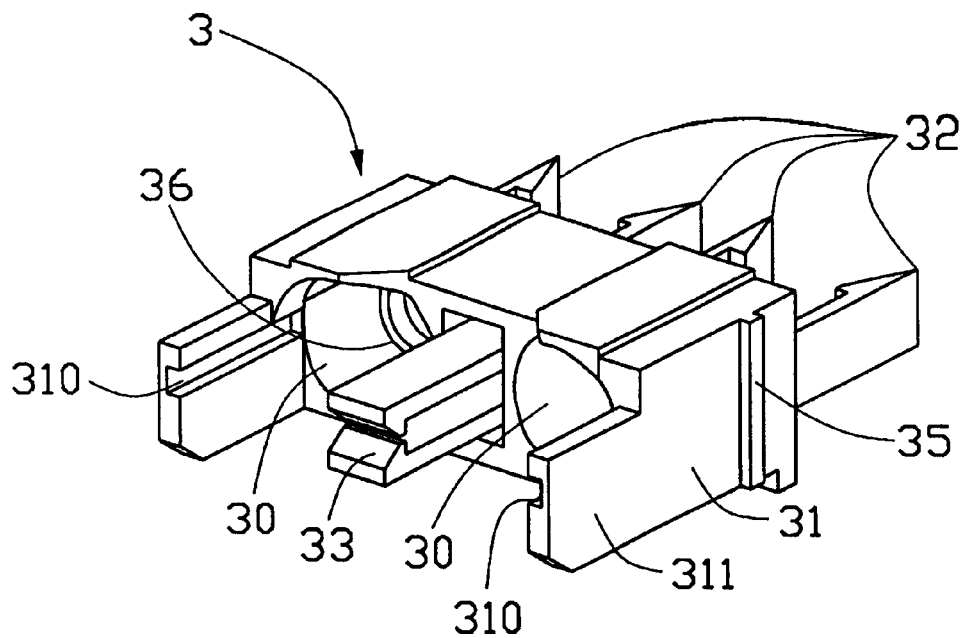
FIG. 4A is an enlarged view of the interconnection bracket of FIG. 1.

Also referring to FIG. 4A, the interconnection bracket 3 comprises a housing 31 defining two cavities 30 therein for receiving a photo diode 41 and a laser diode 42. Each cavity 30 has a shoulder 36 functioning as a stopper when the corresponding diode 41 or 42 are inserted into the cavity 30. The photo diode 41 and the laser diode 42 have similar outlook each having a circular groove 410, 420 defined in the periphery thereof and each having conductive leads 411, 421 extending from a rear face thereof. The housing 31 has two pairs of spring hooks 32 extending from a front face thereof and two rear plates 311 extending from a rear face thereof. Each rear plate 311 defines a channel 310 in an inner surface thereof. A pair of retention hooks 33 proximate to each other extends from a rear face of the housing 31. Ribs 35 are formed in opposite sides of the housing 31 for simultaneously engaging with opposite pairs of the positioning ribs 15 formed in the front side walls 11 of the base 1 when the interconnection bracket 3 is fixed to the base 1.

Figure 4B:
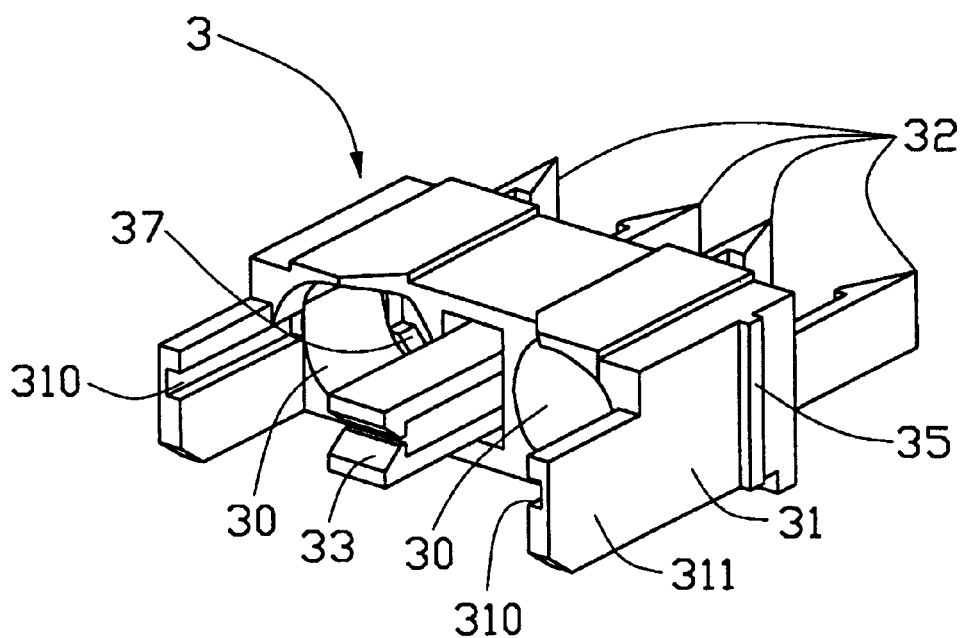
FIG. 4B is an alternative embodiment of the interconnection bracket.

Referring to FIG. 4B, an alternative embodiment of the interconnection bracket 3 is shown, wherein most of the structure of the alternative embodiment is identical to that of the embodiment shown in FIG. 4A except that each cavity 30 has two retention ribs 37 formed in a same virtual plane for rotatably engaging with the circular groove 410 (420) of the photo diode 41 (or laser diode 42). With the additional retention ribs 37, the diodes 41, 42 can be further retained in the cavities 30 of the interconnection bracket 3.

Figure 4C:
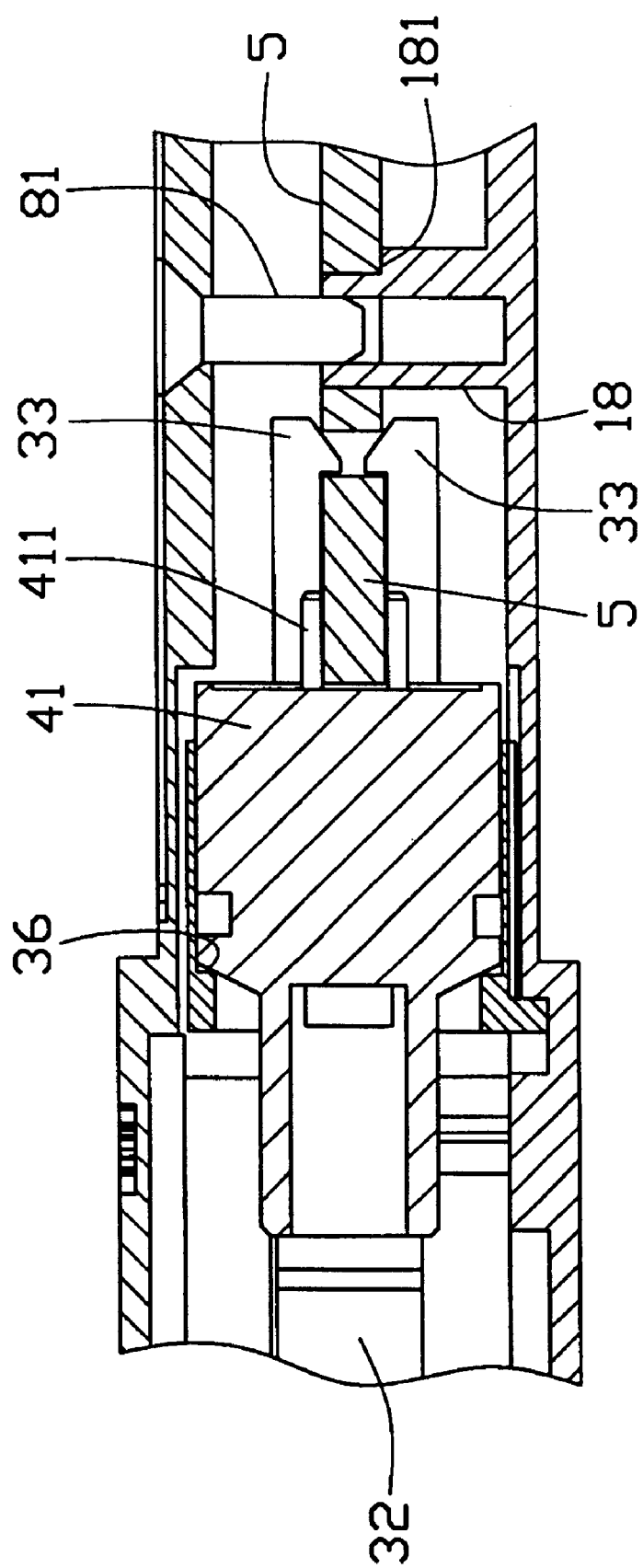
FIG. 4C is a schematic cross-sectional view of the assembled transceiver module of FIG. 1.
Figure 5:
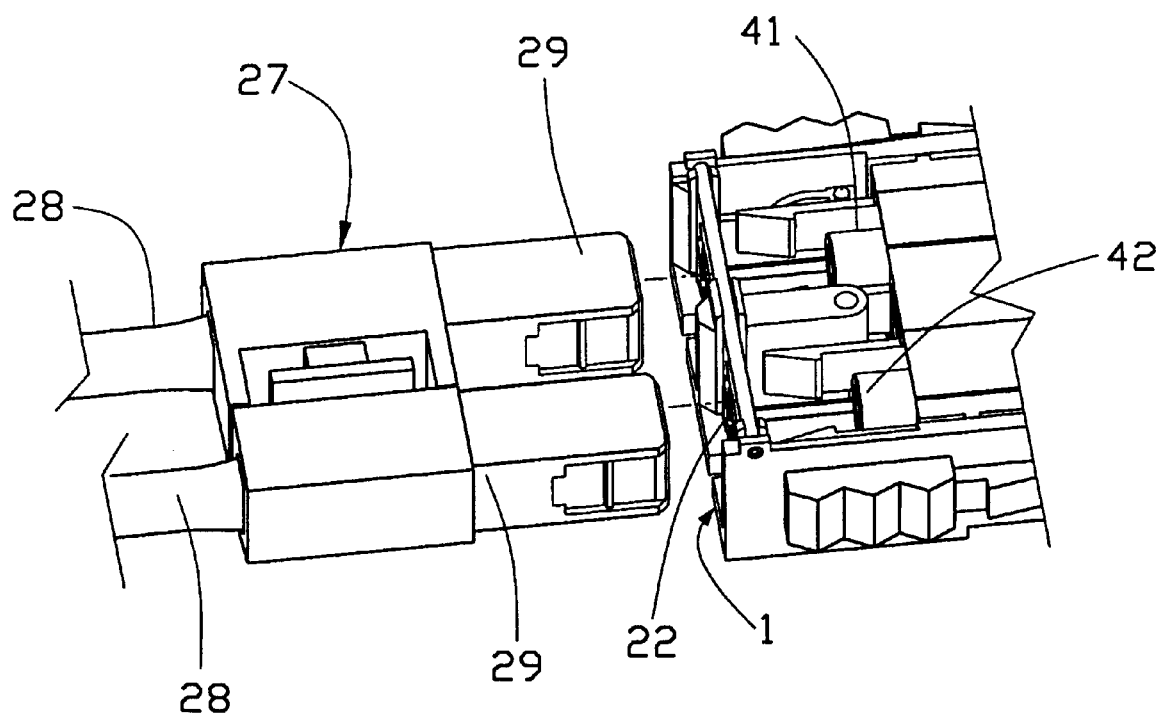
FIG. 5 is a partially perspective view of the transceiver module and a complementary fiber connector to be plugged into the transceiver.
Figure 6:
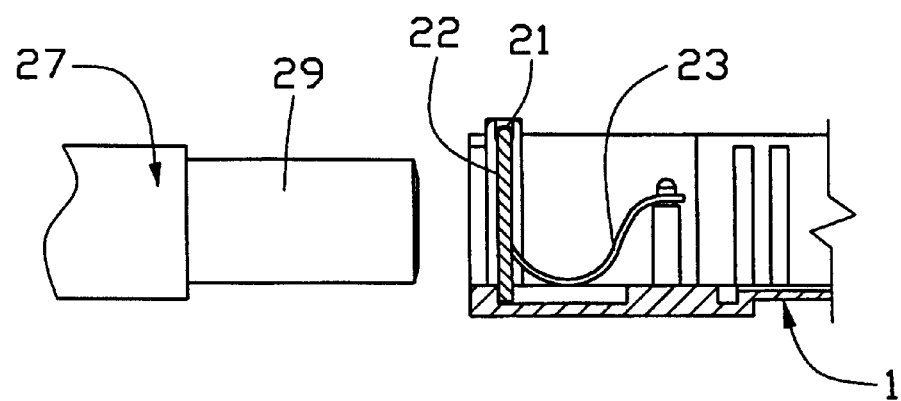
FIG. 6 is a schematic view of FIG. 5 showing the relation between a shielding plate and a spring arm before the complementary fiber connector has been plugged into the transceiver.

The printed circuit board 5 comprises a front narrow section 51 and a rear wide section 52 along a length wise direction thereof. Solder pads 511 are formed on the printed circuit board 5 near a front edge thereof for soldering with the conductive leads 411, 421 of the photo diode 41 and the laser diode 42. A slit 500 is defined in the front narrow section 51 for engaging with the pair of retention hooks 33 when the front edge of the printed circuit board 5 is moved into between the retention hooks 33. A fixing hole 50 is defined in the front narrow section 51 for retaining around the hollow post 18, with the periphery thereof being seated on the peripheral seat 181 around the hollow post 18 as shown in FIG. 4C. Two semi-circular cutouts 520 are defined in opposite sides of the rear wide section 52 for mating with peripheries of the bosses 16 of the base 1. A rear connector 6 such as an SCA2 connector is connected to a rear edge of the printed circuit board 5 by straddle mounting soldering.

The resilient latch 7 has a retention section 70 having a hook end 73 for being engaged with the cutout 130 of the reception socket 13 when the retention section 70 is inserted into the socket 13 of the base 1. A bent-out section 72 is integrated with the retention section 70, yet not in alignment with the former but bent out for a predetermined angle for creating a horizontal offset with respect to the retention section 70. An engagement section 75 is integrated with the bent-out section and parallel to the retention section 70. The engagement section 75 has a ratchet 755 for engaging with a slot of an external guide rail or receptacle (not shown) which removably receives the optical transceiver module therein. A handle section 71 is integrated with the engagement section 75 and has teeth formed thereon for increasing friction when a user operates thereon.

The cover 8 is a metal plate having a shallow groove 88 defined in most area thereof, a hole 80 defined in the shallow groove 88 for being connected to the hollow post 18 of the base 1 via a screw 81 as shown in FIG. 4C. A cap 82 is formed at a front edge of the cover 8 for being located on aligned front top surfaces of the front side supports 11A and the front central support 19A. A reception groove 820 is defined beside the cap 82 for covering the pivot 21 of the shielding door 2 while allowing the pivot 21 to rotate therein. A pair of posts 86 (only one is shown) extends downward from opposite sides of the cover 8 for being inserted into the vertical holes 160 of the bosses 16 when the cover 8 is mounted on the base 1. A pair of middle flanges 83 (only one is shown) extends downward from opposite sides of the cover 8 for being retained in the sockets 13 when the cover 8 is mounted on the base 1. A pair of front flanges 85 (only one is shown) extends downward from opposite sides of the cover 8 for being retained in the positioning space 112 of the base 1 when the cover 8 is mounted on the base 1. A tape 9 is attached on the surface of the shallow groove 88 after the cover 8 has been firmly mounted on the base 1.

Figure 3:
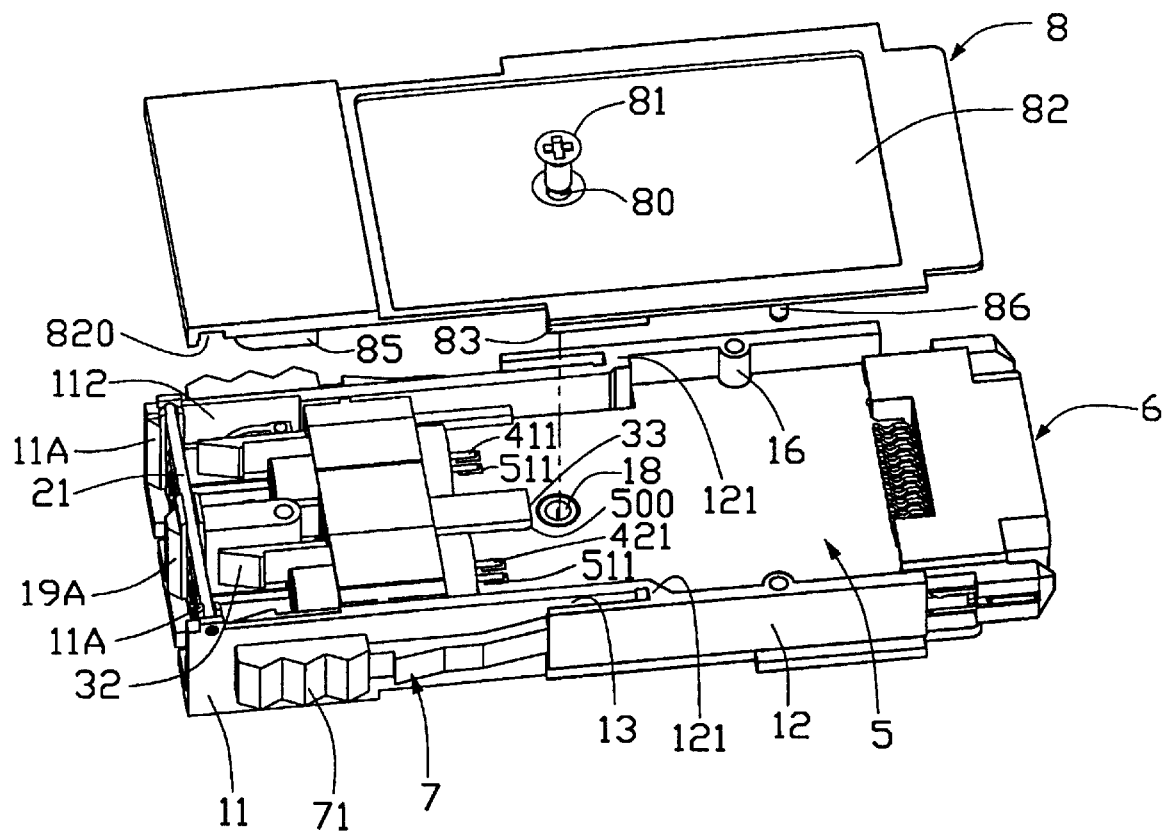
FIG. 3 is a partially assembled view of FIG. 1.

In assembling, the photo diode 41 and the laser diode 42 are firstly fixed in the interconnection bracket 3 by inserting the photo diode 41 and the laser diode 42 into the cavities 30 of the interconnection bracket 3, appropriately rotating the diodes 41, 42 until the conductive leads 411, 421 are oriented in a ready-to-solder position with respect to the printed circuit board 5. For the alternative embodiment of the interconnection bracket 3 shown in FIG. 4B, the first assembling step is similar except that the diodes 41, 42 have to be inserted into the cavities 30 by additional force for fixing the ribs 37 in the circular grooves 410, 420 of the diodes 41, 42 so that the circular grooves 410, 420 can rotatably engage with the retention ribs 37. Secondly, the printed circuit board 5 is moved forward to the interconnection bracket 3 so that the slit 500 can be engaged with the retention hooks 33 and the conductive leads 411, 421 can be in contact with the solder pads 511. Thirdly, perform a soldering procedure in a bake for soldering the conductive leads 411, 421 to the solder pads 511. Fourthly, put the printed circuit board 5 and the interconnection bracket 3 down into the base 1 in position, with the rib 35 of the interconnection bracket 3 being retained in the pair of ribs 15, a lower periphery of each diode 41, 42 being seated in the shallow recess 192, the fixing hole 50 being engaged with the hollow post 18, the semi-circular cutout 520 engaging with the boss 16, and the rear wide section 52 being seated on the positioning steps 17. Fifthly, install the shielding door 2 in the base 1 by putting the pivot 21 in the pivot holes 110, 190 and engaging the hole 230 of the spring arm 23 with the positioning post 141. Sixthly, inserting the retention section 70 of the resilient latch 7 into the reception socket 13 of the base 1, with the hook end 73 of the resilient latch 7 being engaged with the cutout 130 formed in the reception socket 13. The configuration after the above six steps can be referred to FIG. 3. Finally, in a seventh step, the cover 8 is mounted on the base 1, with the hole 80 thereof being firmly secured to the hollow post 18 via the screw 81, the post 86 being retained in the vertical hole 160 of the boss 16, the middle flange 83 being positioned in the reception socket 13 and in contact with the retention section 70 of the resilient latch 7, and the front flange 85 being retained in the positioning space 112.

Figure 7:
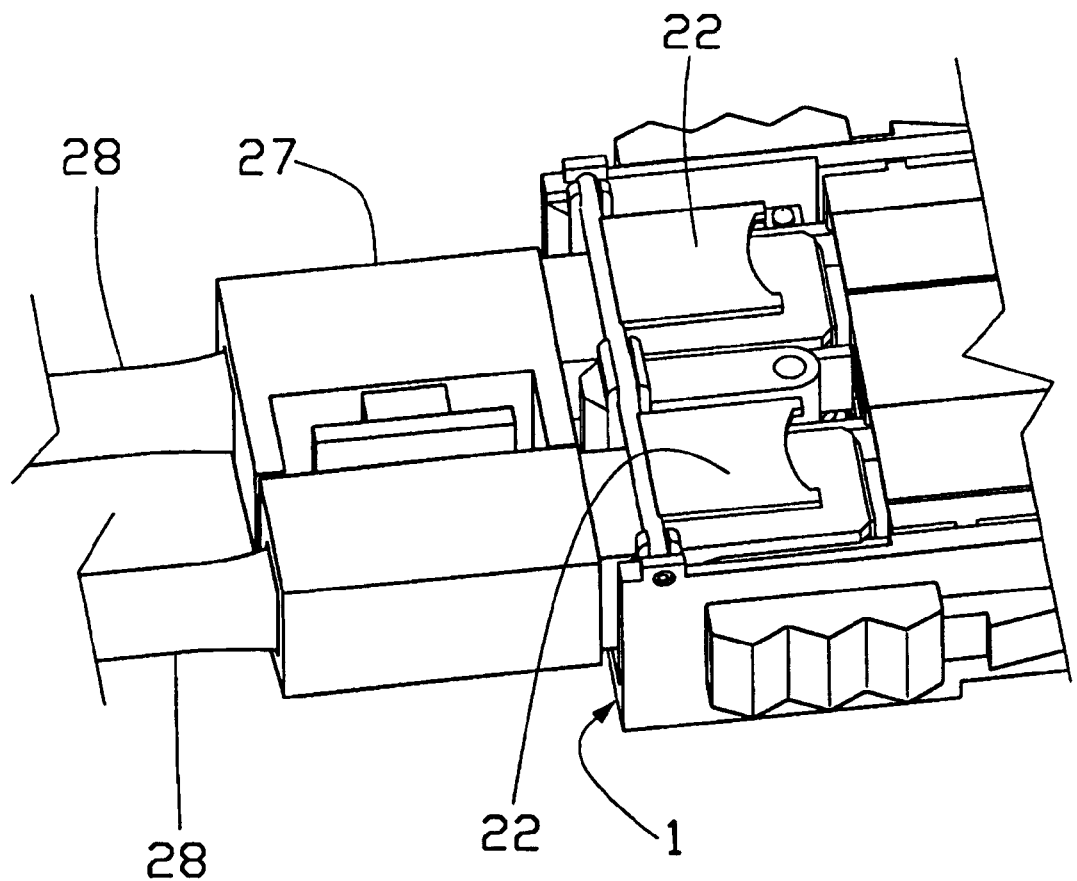
FIG. 7 is an assembled view between the transceiver and the complementary fiber connector of FIG. 5.
Figure 8:
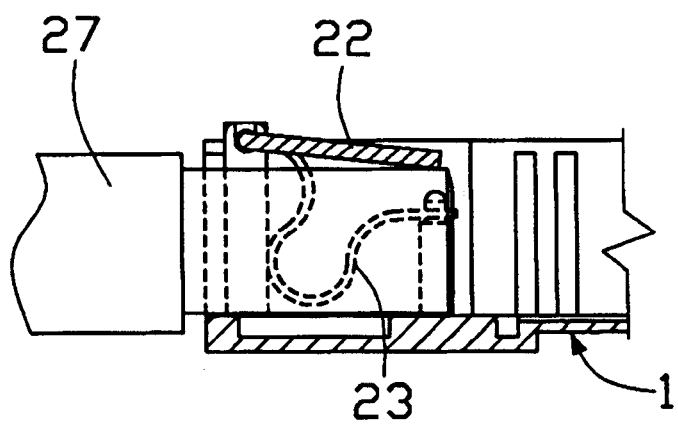
FIG. 8 is a schematic view of FIG. 7 showing the relation between the shielding plate and the spring arm after the complementary fiber connector has been fully plugged into the transceiver.

The activity and function of the shielding door 2 may be referred to FIGS. 5 to 8. Firstly, referring to FIGS. 5 and 6, a fiber connector 27 connected with two fiber cables 28 and having two plugs 29 is ready for insertion into the optical transceiver. Before the plugs 29 are inserted into the optical transceiver module, the shielding plate 22 is maintained vertical to the base 1 and the spring arm 23 remains in its original shape. After the plugs 29 are inserted into the optical transceiver, the pivot 21 is forced to rotate for substantially ninety degrees causing the shielding plate 22 to remain parallel to the base 1, meanwhile the spring arm 23 is deformed and reserves tension therein, as shown in FIG. 7 and 8. When the fiber connector 27 is withdrawn from the optical transceiver, the spring arms 23 recover to their normal form forcing the pivot 21 to rotate for ninety degrees and causes the shielding plates 22 to recover vertical to the base 1.

While the present invention has been described with reference to a specific embodiment, the description is illustrative of the invention and is not to be construed as limiting the invention. Therefore, various modifications to the present invention can be made to the preferred embodiment by those skilled in the art without departing from the true spirit and scope of the invention as defined by the appended claims.

What is claimed is:

1. A transceiver module comprising:

an interconnection bracket detachably fixed in a base;

said base including a bottom plate and two side walls, plural positioning ribs formed on the side walls and a post on the bottom plate;

a printed circuit board forwardly assembled to the bracket, a slit formed in the printed circuit board;

said bracket comprising:

a housing defining two cavities therein, each of said cavities having a shoulder thereon and a retention rib formed on one side of the housing;

two diodes respectively received within the corresponding cavities, each of said diodes having a circular groove defined in periphery thereof, said retention rib engaged within the corresponding circular groove for retaining the corresponding diode in position, the diode contacting the shoulder of the corresponding cavity;

two pairs of spring hooks extending forward from the housing and respectively retaining two external plugs inserted into the cavities;

two rear plates extending rearward from the housing and guiding the diodes to be inserted into the corresponding cavities, each of said rear plates defining a channel in an inner surface thereof, said channels engaging two sides of the printed circuit board and guiding and receiving the external printed circuit board;

a pair of retention hooks proximate to each other extending rearward from the housing, said pair of retention hooks engaging within the slit for fixing said inserted printed circuit board;

said bracket including means for cooperating with the positioning ribs for downwardly loading the bracket to the base, and said printed circuit board including means for cooperating with the post for downwardly loading the printed circuit board to the base.

\* \* \* \* \*